US012754057B2

(12) United States Patent
Spears et al.

(10) Patent No.: US 12,754,057 B2
(45) Date of Patent: *Oct. 6, 2026

(54) SYSTEM AND METHOD OF DETECTING FLUID LEVELS IN TANKS

(71) Applicant: Plainsight Technologies Inc., San Diego, CA (US)

(72) Inventors: Logan Spears, Kingston, WA (US); Carlos Anchia, Plano, TX (US); Corey Staten, Columbus, OH (US); Wei Xu, Seattle, WA (US)

(73) Assignee: Plainsight Technologies Inc., Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/830,983

(22) Filed: Sep. 11, 2024

(65) Prior Publication Data

US 2025/0189361 A1 Jun. 12, 2025

Related U.S. Application Data

(63) Continuation of application No. 18/141,962, filed on May 1, 2023, now Pat. No. 12,117,330, which is a continuation of application No. 17/649,927, filed on Feb. 3, 2022, now Pat. No. 11,674,839.

(51) Int. Cl.
*G01F 23/292* (2006.01)
*H04N 5/33* (2023.01)

(52) U.S. Cl.
CPC ............. *G01F 23/292* (2013.01); *H04N 5/33* (2013.01)

(58) Field of Classification Search
CPC ........ G06V 10/24; G06V 20/10; G06V 20/52; G06V 20/647; G06T 2207/10024; G06T 2207/10048; G06T 2207/20076; G06T 2207/30004; G06T 2207/30184; G06T 2207/30232; G06T 7/0012; G06T 7/62; G06T 7/70; G06T 7/90; A61B 5/02042; G01F 22/00; G01F 23/292; G01F 25/20
USPC .......................................................... 348/164
See application file for complete search history.

(56) References Cited

U.S. PATENT DOCUMENTS

| | | | | |
|---|---|---|---|---|
| 8,358,903 | B1 * | 1/2013 | Meads | G06Q 10/087 348/86 |
| 11,674,839 | B1 | 6/2023 | Spears et al. | |
| 12,117,330 | B2 | 10/2024 | Spears et al. | |

(Continued)

*Primary Examiner* — Masum Billah
(74) *Attorney, Agent, or Firm* — Bochner PLLC; Andrew D. Bochner

(57) ABSTRACT

A method comprising receiving, from a infrared image capture device, an image including a fluid storage tank storing a fluid, the image including an image intensity associated with a temperature of the fluid storage tank with an internal surface that is in contact with the fluid and an image intensity associated with a temperature of the first fluid storage tank with an internal surface that is not in contact with the fluid, generating feature maps, sliding a window to obtain a plurality of anchor shapes using a region proposal network, determining if each anchor shape contains an object to generate a plurality of regions of interest, extracting feature maps from each region of interest, classifying objects in each region of interest, identifying stored fluid using the objects, determining volume of stored fluid based on the stored fluid, and providing the volume to a digital device for display.

9 Claims, 8 Drawing Sheets

(56) References Cited

U.S. PATENT DOCUMENTS

| | | | | |
|---|---|---|---|---|
| 2011/0268329 | A1* | 11/2011 | Pronkine | G01F 23/804 382/128 |
| 2016/0144959 | A1* | 5/2016 | Meffert | B64C 39/024 701/3 |
| 2016/0214715 | A1* | 7/2016 | Meffert | G01S 17/88 |
| 2018/0356512 | A1* | 12/2018 | Alkhabbaz | G01F 23/284 |
| 2020/0340848 | A1* | 10/2020 | Alkhabbaz | G01F 23/686 |
| 2021/0123784 | A1* | 4/2021 | Schwach | G01J 5/0037 |
| 2021/0407121 | A1* | 12/2021 | Shapiro | G01F 25/20 |

* cited by examiner

600

SYSTEM AND METHOD OF DETECTING FLUID LEVELS IN TANKS

CROSS-REFERENCE TO RELATED APPLICATIONS

This application is a continuation of, and seeks the benefit of U.S. patent application Ser. No. 18/141,962, filed on May 1, 2023 and entitled "System and Method of Detecting Fluid Levels in Tanks," which is a continuation of, and seeks the benefit of U.S. patent application Ser. No. 17/649,927, filed on Feb. 3, 2022 and entitled "System and Method of Detecting Fluid Levels in Tanks," now issued as U.S. Pat. No. 11,674,839, both of which are incorporated herein by reference in their entireties.

FIELD OF THE INVENTION(S)

Embodiments of the present invention(s) generally relate to systems that monitor fluid levels in tanks and more particularly utilizing image processing for fluid level detection.

BACKGROUND

Fluid levels in tanks are typically difficult to measure and monitor. For example, the owner or operator of an oil storage facility may wish to measure and monitor oil levels within the tanks to track a stored fluid amount, fluid input into the tank, fluid output from the tank, rate of increase, and rate of decrease.

In the prior art, a flotation device is placed within a fluid storage tank. The device measures the fluid from within the tank and provides information regarding fluid levels to a device outside the tank (usually wirelessly).

There are many problems with this approach. In order to place the device within the tank, the tank may be required to be emptied or a portion of the stored fluid removed to put the device within the tank. This process is expensive, unsanitary, environmentally unsafe, prone to loss of fluid (e.g., loss of product due to leaks), and wastes time. Further, the device must be activated and configured to detect fluid levels before being placed within the tank. If the device is faulty (e.g., the device fails to communicate with equipment outside the tank) or is not correctly configured, the device may have to be retrieved and replaced.

Retrieval of a faulty device from the fluid tank is difficult and time-consuming. Further, retrieval of the device from the inside of a large chemical or oil tank may be difficult, require a considerable amount of time, may be unsafe, and may create real dangers to a refinery, storage field, industrial site, and surrounding homes.

Further, fluid (e.g., oil) leaks may be difficult to detect. For example, some leaks may only be detected after significant loss (e.g., a significant pipe breach) or a major accident (e.g., fire). Further, a considerable amount of fluid may be lost that is never detected. For example, there may be losses at one or more points in a system but the individual losses may not be significant at any one point to trigger attention. As a result of many small leaks, a considerable amount of oil may be lost before detection. Further, small leaks may lead to large leaks and accidents, resulting in significant environmental damage, damage to infrastructure, and loss of life.

Further, to meet an increasing number of state and federal regulatory compliance requirements of the oil and gas industry, producers are seeking systems that continuously monitor and detect fluid levels, trigger alerts, and provide information regarding leak location and severity.

SUMMARY

An example system includes at least one processor and memory. The memory may contain instructions to control any number of the at least one processor to: receive, from a first infrared image capture device with a first field of view, a first image including a first fluid storage tank storing a first fluid, the image including a plurality of image intensities, a first image intensity associated with a first temperature of a first portion of the first fluid storage tank with a first internal surface that is in contact with the first fluid stored therein and a second image intensity associated with a second temperature of a second portion of the first fluid storage tank with a second internal surface that is not in contact with the first fluid, generate feature maps from the first image by applying at least a first convolutional neural network, slide a first window across the feature maps to obtain a plurality of anchor shapes using a region proposal network, determine if each anchor shape of the plurality of anchor shapes contains an object to generate a plurality of regions of interest, extract feature maps from each region of interest, classify objects in each region of interest, identify first stored fluid using the objects based on classifications and segmentation masks, determine first volume of stored fluid based on the first stored fluid, and provide first volume to a digital device for display.

In various embodiments, the instructions may further determine a fluid level of the first stored fluid within the first fluid storage tank. In some embodiments, the instructions may further control the processor(s) to further determine provide the first image and first volume to the digital device for display.

The memory may contain instructions to control the processor(s) to further: compare the first volume to a previously determined volume of the first storage tank taken at a different time to generate a volume rate change, compare the volume rate change to threshold, and provide a notification to the digital device based on the comparison of the volume rate change to the threshold. In some embodiments, the threshold may be received from a digital device. The threshold, in some embodiments, may be based on a comparison of previous historical volumes of the first storage tank to a historical rate change for a particular duration of time, wherein the threshold is the historical rate change. The threshold may be updated using the previous historical volumes of the first storage tank for an updated duration of time, in some embodiments.

Each of the plurality of regions of interest may be a non-rectangular, polygonal shape.

In some embodiments, the first image further includes a second fluid storage tank storing a second fluid, a third image intensity associated with a third temperature of a first portion of the second fluid storage tank with a third internal surface that is in contact with the second fluid stored therein and a fourth image intensity associated with a fourth temperature of a second portion of the second fluid storage tank with a fourth internal surface that is not in contact with the second fluid. The memory may contain the instructions to control any number of the at least one processor to further: identify second stored fluid using the objects based on classifications and the segmentation masks, determine second volume of stored fluid based on the second stored fluid, and provide first volume to a digital device for display.

An example non-transitory computer readable medium comprising instructions to a control at least one processor to perform a method, the method comprises: receiving, from a first infrared image capture device with a first field of view, a first image including a first fluid storage tank storing a first fluid, the image including a plurality of image intensities, a first image intensity associated with a first temperature of a first portion of the first fluid storage tank with a first internal surface that is in contact with the first fluid stored therein and a second image intensity associated with a second temperature of a second portion of the first fluid storage tank with a second internal surface that is not in contact with the first fluid, generating feature maps from the first image by applying at least a first convolutional neural network, sliding a first window across the feature maps to obtain a plurality of anchor shapes using a region proposal network, determining if each anchor shape of the plurality of anchor shapes contains an object to generate a plurality of regions of interest, extracting feature maps from each region of interest, classifying objects in each region of interest, identifying first stored fluid using the objects based on classifications and segmentation masks, determining first volume of stored fluid based on the first stored fluid, and providing first volume to a digital device for display.

The method may further comprise determining a fluid level of the first stored fluid within the first fluid storage tank. In some embodiments, the method may further comprise determining provide the first image and first volume to the digital device for display.

In some embodiments, the method may further comprise: comparing the first volume to a previously determined volume of the first storage tank taken at a different time to generate a volume rate change, comparing the volume rate change to threshold, and providing a notification to the digital device based on the comparison of the volume rate change to the threshold.

The method may further comprise receiving the threshold from the digital device. The threshold may, in some embodiments, be based on a comparison of previous historical volumes of the first storage tank to a historical rate change for a particular duration of time, wherein the threshold is the historical rate change. The method may further comprise updating the threshold using the previous historical volumes of the first storage tank for an updated duration of time. Each of the plurality of regions of interest may be a non-rectangular, polygonal shape. Alternately, each of the plurality of regions of interest may be rectangular in shape.

In some embodiments, the first image further includes a second fluid storage tank storing a second fluid, a third image intensity associated with a third temperature of a first portion of the second fluid storage tank with a third internal surface that is in contact with the second fluid stored therein and a fourth image intensity associated with a fourth temperature of a second portion of the second fluid storage tank with a fourth internal surface that is not in contact with the second fluid. The method may comprise identifying second stored fluid using the objects based on classifications and the segmentation masks, determining second volume of stored fluid based on the second stored fluid, and providing first volume to a digital device for display.

An example method may comprise receiving, from a first infrared image capture device with a first field of view, a first image including a first fluid storage tank storing a first fluid, the image including a plurality of image intensities, a first image intensity associated with a first temperature of a first portion of the first fluid storage tank with a first internal surface that is in contact with the first fluid stored therein and a second image intensity associated with a second temperature of a second portion of the first fluid storage tank with a second internal surface that is not in contact with the first fluid, generating feature maps from the first image by applying at least a first convolutional neural network, sliding a first window across the feature maps to obtain a plurality of anchor shapes using a region proposal network, determining if each anchor shape of the plurality of anchor shapes contains an object to generate a plurality of regions of interest, extracting feature maps from each region of interest, classifying objects in each region of interest, identifying first stored fluid using the objects based on classifications and segmentation masks, determining first volume of stored fluid based on the first stored fluid, and providing first volume to a digital device for display.

DETAILED DESCRIPTION

Figure 1:
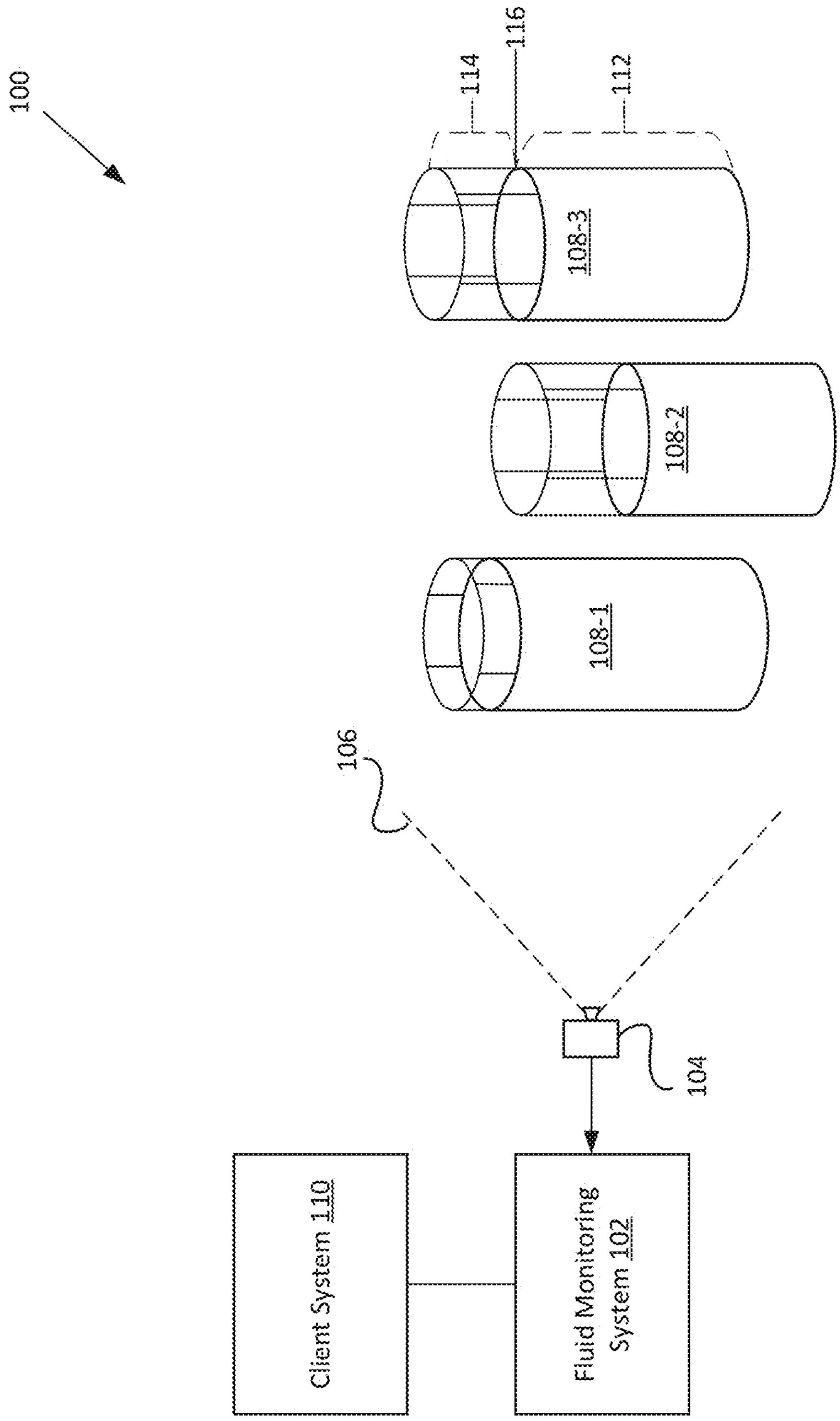
FIG. 1 depicts a block diagram of an example environment capable of monitoring fluids according to some embodiments.

Various embodiments described herein include a system for continuous monitoring of fluids (e.g., chemical fluids, fuels, or oil). In one example, the system may utilize one or more image capture devices mounted within a fluid storage facility. A fluid storage facility may be or include pipeline stations, refinery facilities, and manufacturing plants.

Liquid inside a storage tank may be cooler or warmer than the air outside the tank as well as air contained within the tank. For example, fluid density affects heat transfer, making the fluid cooler or hotter than the air above the fluid within the tank. For this reason, different parts of the tank may have different temperatures depending on the fluid level. For example, the part of the tank that is in contact with the stored fluid may be at one temperature and another part of the tank (e.g., above a level of the stored fluid) that is not in contact with the stored fluid may have a different temperature.

In some embodiments, a fluid monitoring system may include image capture device(s) positioned in multiple places throughout the fluid storage facility. The image capture device(s) may be or include a thermographic camera (e.g., an infrared (IR) camera, thermal imaging camera, thermal camera, or thermal imager). Images may be taken of one or more fluid storage tanks using the thermographic camera. The images may depict differences in heat that correspond to a level of fluid within a tank. The images may depict differences in heat as differences in brightness (e.g., pixel intensities).

The fluid monitoring system may process digital video or images from the thermographic camera to monitor and identify the level of fluids within a tank (e.g., storage tank or another container) that may not be visible to the naked eye. An infrared image of the tank may show a variation between a first portion of the outside of the storage tank closest to the ground (e.g., that portion of the tank containing fluid on the inside of the tank) and a second portion of the outside of the storage tank above the contained fluid level (e.g., the portion of the tank containing air or gas above the contained liquid).

Using image recognition, the fluid monitoring system may identify differences between different portions of a tank and determine the liquid level (e.g., the top of the liquid) contained within the tank. The fluid monitoring system may subsequently provide alerts if the liquid level is rapidly changing and/or calculate an amount of fluid contained within the tank. The calculated amount of fluid may be compared to expectations to verify or confirm the amount of stored fluid, identify potential loss, alert for potential leaks, provide confirmation for regulatory compliance, and/or the like.

The fluid monitoring system may provide images and/or indications of internal fluid levels of one or more tanks in real-time or near real-time. Furthermore, the fluid monitoring system may provide notification of a detected fluid leak. The notification may include the location of the fluid leak (e.g., geographic coordinates or location identifiers of the fluid leak) and flow rate of the fluid leak.

In some embodiments, the fluid monitoring system may store images, process the images, detect fluid levels, document the process, and/or the like to assist in recreation of processes for regulatory needs, improve the accuracy of alerts, and/or improve the system for determining fluid levels within one or more tanks (e.g., improvement of image processing and object identification). The fluid monitoring system may utilize an AI system to recognize artifacts, objects, and the like in images that indicate fluid levels. The fluid monitoring system may store information and/or meta information regarding the AI processing, including, for example, segmentation masks or non-rectangular, polygon shapes of the fluid levels.

It may be appreciated that the fluid monitoring system may be capable of continuously monitoring and detecting the fluid levels.

FIG. 1 depicts a block diagram of an example environment 100 capable of monitoring fluid levels within one or more tanks according to some embodiments. The example environment 100 includes a fluid monitoring system 102, an image capture device 104 with a field of view 106, fluid storage tanks 108-1 through 108-3, and a client system 110.

The fluid monitoring system 102 may monitor fluid levels in one or more fluid storage tanks (e.g., fluid storage tanks 108-1 through 108-3). In some embodiments, the fluid monitoring system 102 may simultaneously monitor two or more fluid storage tanks. Each of the two or more fluid storage tanks may contain the same type or different types of fluid (e.g., one tank may contain oil and another tank may contain fuel). In various embodiments, the image capture device 104 may be positioned such that the field of view 106 is directed to any number of fluid storage tanks.

The fluid monitoring system 102 may utilize an image capture device 104 capable of capturing images in the infrared spectrum (IR). In one example, Forward-Looking Infrared (FLIR) cameras may be utilized to visualize or monitor fluid levels contained within a storage tank.

The image capture device 104 may include a field of view 106 directed to the fluid storage tanks 108-1 through 108.3. The fluid in the storage tanks may be at a different temperature than the tank itself (e.g., a different temperature than the shell of the tank). Liquid inside a tank may be cooler or warmer than the air contained in the tank and air outside the tank. It will be appreciated that fluid density affects heat transfer thereby making the fluid cooler or hotter than the air above the fluid within the tank. For this reason, portions of the tank (e.g., the material that makes up the tank enclosure) may have a different temperature depending on the fluid level (e.g., the temperature of the tank where there is fluid may be a different temperature than the temperature of the tank above the fluid level).

In this example, fluid storage tank 108-1 is an enclosure configured to store fluid. The enclosure includes two sides, namely, an interior side and an exterior side. If the fluid storage tank 108-1 contains a fluid, then the side facing the fluid is on the interior of the tank and the side facing away from the fluid and in contact with outside air is on the exterior of the tank. The portion of the tank that is both inside the tank and in contact with the stored fluid may have a first temperature. The portion of the tank that is both inside the tank and not in contact with the stored fluid (e.g., the inside part of the tank that is above the fluid line) may have a second temperature. Similarly, the portion of the tank that is outside the tank (i.e., on the exterior) and directly across from the stored fluid (e.g., the outside part of the tank that is directly across from the inside part of the tank that is in contact with the stored fluid) may be at a third temperature. The portion of the tank that is both outside and directly across from the inside part of the tank that is not in contact with the stored fluid may be at a fourth temperature. The third temperature and the first temperature may be the same. Further, the fourth temperature and the first temperature may be the same.

Since the fluid contained within a tank influences temperature, the difference between the third and the fourth temperatures may be discernable in an infrared image (e.g., by pixel brightness intensities within the image). Similarly, the fluid level (e.g., the top of the fluid contained within the tank) may also be discernable in the infrared image.

In FIG. 1, the temperature of the tank at tank portion 112 of tank 108-3 may be different than the temperature of the tank at tank portion 114. The "skin" or outer side of the tank at tank portion 112 may be at a specific temperature (or a temperature range) due to the presence of the fluid (and the related fluid density impact on thermodynamics) contained within the tank 108-3. The "skin" or outer side of the tank at tank portion 114 may be at a different temperature (or a different temperature range) due to the lack of fluid presence (or air). The density of the air is different than the fluid density and, as a result, the temperature of the tank at tank portion 114 may be different that the temperature of the tank at tank portion 112.

The fluid level 116 is at the top surface of the fluid contained within a tank. In some embodiments, the fluid level 116 is discernable by thermographic imaging (e.g., using an IR image capture device). In the example of FIG. 1, the image capture device 104 may be a thermographic device that captures an image of the tank 108-3. The image may depict the fluid level 116 as being the point of change between the top of the fluid contained in the tank and the air above the fluid.

The image capture device 104 may be positioned at any distance from one or more fluid tanks. In one example, the image capture device 104 is positioned within 300 feet of oil and gas equipment. It will be appreciated that the image capture device 104 may be positioned overlooking fluid tanks.

Multiple image capture devices may be placed in various locations throughout a fluid station (e.g., a facility with any number of fluid tanks). In some embodiments, the field of view of the different image capture devices may overlap such that a tank may be within more than one field of view (e.g., by different image capture devices). By overlapping some of the field of view of different image capture devices 104, the process of identifying a fluid level contained within a tank may be verified and/or confirmed. Further, information from two or more image capture devices may be used to identify errors in image processing and/or assist in teaching an artificial intelligence (AI) process. It will be appreciated that the fluid level identified or determined by processes discussed herein may be confirmed or verified by many different ways.

Fluid level detection using cameras (e.g., those cameras capable of imaging in IR) may enable quick and safe detection and visualization of fluid levels within any number of tanks. The cameras may capture images that depict temperature changes. The images may then be assessed by the fluid monitoring system 102 to track and measure current storage. Further, the fluid monitoring system 102 may provide quick detection of leaks for repair. As a result, quick leak detection may reduce production inefficiencies and prevent damage to the environment.

The fluid monitoring system 102 may provide a visualization of stored fluid by providing images depicting differentiating temperature on the outer side of the tanks to a user interface on the client system 110.

The fluid monitoring system 102 may receive images and/or stream from the image capture device 104. In various embodiments, the fluid monitoring system 102 utilizes one or more models from region-based convolution neural networks for stored liquid level identification.

In various embodiments, the fluid monitoring system 102 selects images received from the image capture device 104 (e.g., from video) and locates pixels of objects in the image, for instance, segmentation (e.g., using Mask R-CNN or any R-CNN process). For each image, the fluid monitoring system 102 may create region proposals, classify the region proposals, and generate segmentation masks to identify potential leaks.

The fluid monitoring system 102 and the client system 110 may be digital devices or collections of digital devices. For example, the fluid monitoring system 102 may include a local digital device that communicates with another system via the Internet or a network. The system may receive and analyze one or more images and return information to the local device which may be shared with the client system 110.

Figure 8:
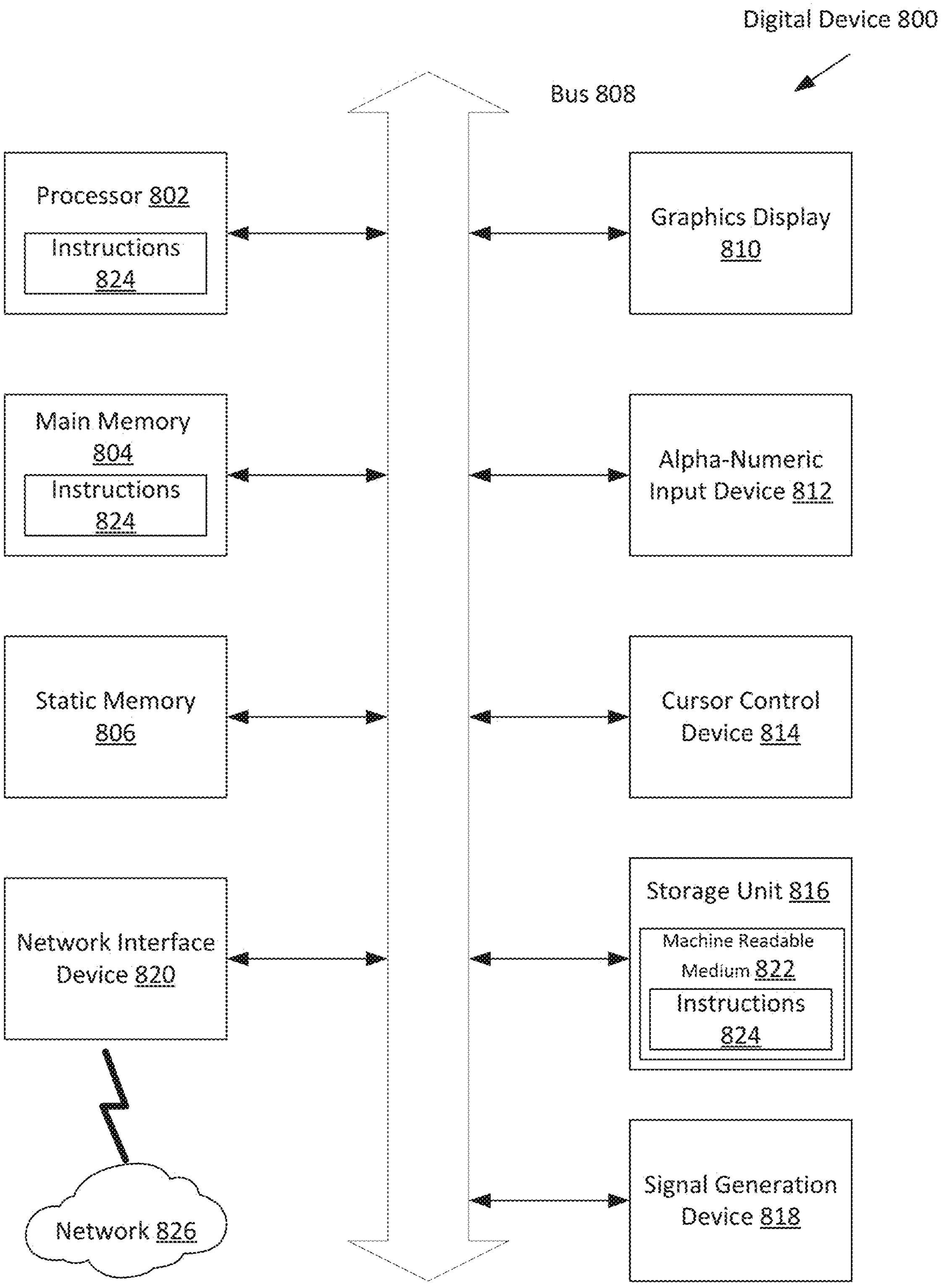
FIG. 8 depicts a block diagram of an example computing device according to some embodiments.

A digital device is any device with at least one processor and memory. Example digital devices include a computer such as a laptop, personal computer, server, terminal, media tablet, smartwatch, smartphone, and/or the like. An example of a digital device is depicted in FIG. 8.

The client system 110 may be any digital device controlled by a user to assess images and information (e.g., volume determinations) from the fluid monitoring system 102. In one example, the client system 110 may be a smartphone, tablet, personal computer, or the like, which may communicate with the fluid monitoring system 102 over a network (e.g., WiFi, Internet, cellular network, Bluetooth, or the like). The client system 110 may receive alerts of unexpected volume changes (e.g., rate changes) and/or notifications of a fluid leak from the fluid monitoring system 102.

In various embodiments, the client system 110 may communicate directly with the fluid monitoring system 102 or over a communication network. For example, the client system 110 may communicate with a control system over a communication network to receive or view images and information. The control system may be a digital device or a collection of digital devices.

The client system 110 may receive information (e.g., images, video, processing, features, or the like) from the fluid monitoring system 102 regarding estimates of the volume of stored fluid, fluid levels, rate of change of fluid levels, a fluid leak, or the like. The client system 110 may notify a user of the client system 110 of a fluid leak, significant changes in fluid levels (e.g., changes in fluid level that are over or below one or more fluid-rate-of-change thresholds).

In some embodiments, a user (e.g., a client) may contact the client system 110 or the fluid monitoring system 102 by navigating to a webpage that retrieves or receives information regarding images, changes in fluid levels, and/or fluid leaks from the client system 110 and/or the fluid monitoring system 102.

It may be appreciated that the fluid monitoring system 102 may be or include a web server, server, or other device configured to receive images from any number of image capture devices (e.g., relayed by a local digital device in communication to a subset of the image capture devices) over a network. The fluid monitoring system 102 may provide analysis, images, and/or alerts of detected fluid leaks for any number of fluid facilities that are remote to each other.

Further, in some embodiments, the fluid monitoring system 102 may receive images from fluid stations that are commonly owned, or are owned by different entities. As such, the fluid monitoring system 102 may be enabled to serve different entities with different subsets of fluid stations. It may be appreciated that AI systems may be trained with any number of images from any number of fluid facilities (e.g., from the same or different owners) to improve fluid level recognition.

The fluid station may be or include a facility with equipment for the purposes of storing, moving, or transporting fluid (e.g., oil, fuel, or the like).

The fluid monitoring system 102 (e.g., using the AI engine 208 discussed with regard to FIG. 2) may utilize a CNN to assist in identifying portions of images associated with contained fluids (e.g., based on pixel intensity of an image captured by an IR capture device). For example, the fluid monitoring system 102 may identify region proposals in an image, classify the proposals, and generate bounding boxes or non-rectangular, polygonal shapes using a convolutional neural network. The fluid monitoring system 102 may utilize a backbone network (e.g., a standard CNN). Earlier layers may detect low-level features while later features detect high-level features. A Feature Pyramid Network (FPN) is an extension of the backbone network which may represent objects at multiple scales. The FPN may include two pyramids where the second pyramid receives the high-level features from the first pyramid and passes them to the lower layers. This allows every level to have access to both lower and higher-level features.

The fluid monitoring system 102 (e.g., using the AI engine 208 discussed with regard to FIG. 2) may utilize a Region Proposal Network (RPN) to scan the FPNs (e.g., apply a window across a feature map) and propose regions that may contain objects and representations (e.g., color changes depicted in a cloud) of stored fluids and/or fluid levels. The fluid monitoring system 102 may utilize a set of boxes or non-rectangular, polygonal shapes (e.g., anchors) with defined locations and scales according to the input images. Individual sets of boxes or non-rectangular, polygonal shapes may be assigned classes. The RPN, in this example, may generate two outputs for each set of boxes or non-rectangular, polygonal shapes, including, for example, anchor class and bounding box/non-rectangular, polygonal shapes specifications. The anchor class may be either a foreground class or a background class.

The fluid monitoring system 102 may utilize RoIAlign for convolutions in which a feature map is sampled at different points and then a bilinear interpolation is applied to get a precise idea of what would be at each pixel.

The fluid monitoring system 102 then may utilize a convolutional network to take the regions selected by the ROI classifier (e.g., any number of support vector machines (SVMs)) and generate segmentation masks.

Figure 2:
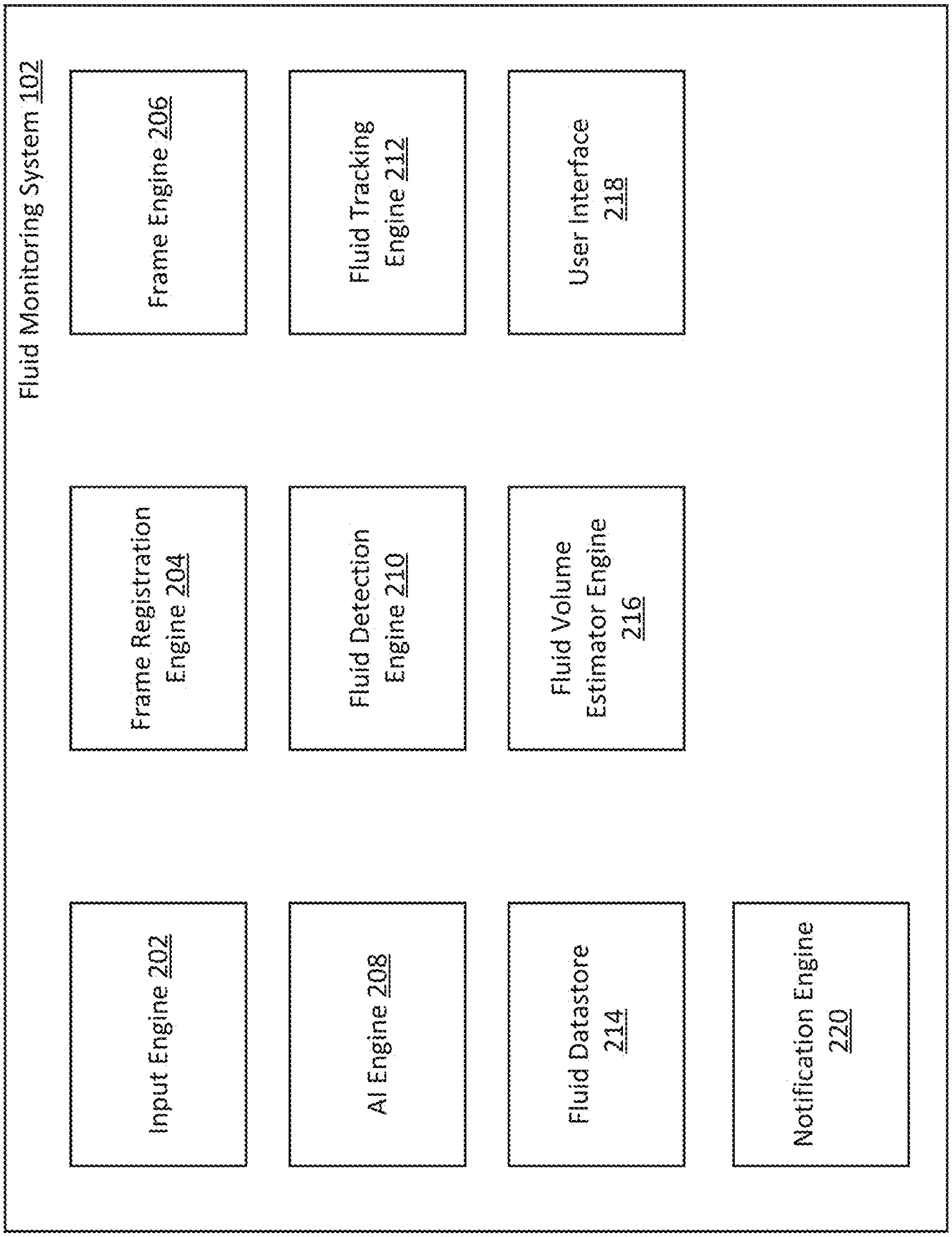
FIG. 2 depicts a block diagram of an example fluid monitoring system 102 according to some embodiments.

FIG. 2 depicts a block diagram of an example fluid monitoring system 102 according to some embodiments. As discussed herein, the fluid monitoring system 102 may include any number of digital devices. In one example, the fluid monitoring system 102 includes at least one system-on-module (SOM) device, such as NVIDIA's Jetson AGX Xavier, memory, and a communication interface configured to receive images and/or streams from the image capture device 104.

The fluid monitoring system 102 includes an input engine 202, a frame registration engine 204, a frame engine 206, an artificial intelligence (AI) engine 208, a fluid detection engine 210, a fluid tracking engine 212, a fluid datastore 214, a fluid volume estimator engine 216, user interface 218, and a notification engine 220. The fluid monitoring system 102 and the client system 110 may each be or include any number of digital devices.

The input engine 202 may be configured to receive and decode images and/or video from the image capture device(s) 104. In various embodiments, the input engine 202 takes images or slices of the video for further processing. The input engine 202 may select any number of the IR images (e.g., periodically select images) for processing by the frame registration engine 204. In some embodiments, the input engine 202 may receive video (e.g., at ten frames-per-second (fps) from the FLIR camera) of the image capture device 104. The video or images received by the input engine 202 may be grayscale images (as is the case with IR imaging). In some embodiments, the input engine 202 may also receive images of the visual spectrum captured by other image capture devices. The images of the visual spectrum may be of the same or similar field of view as that of IR images. The input engine 202 may receive images at a pixel resolution (e.g., 320×240 pixels). In various embodiments, the input engine 202 receives images with a pixel resolution that is less than 320×240 pixels.

In various embodiments, the frame registration engine 204 may receive images from the input engine 202. In some embodiments, the frame registration engine 204 performs image stabilization of the received images by removing motion artifacts in the images (e.g., from birds or objects blowing in the wind). Further, motion artifacts may be caused by the motion of the image capture device due to vibration of platforms or mounts coupled to the image capture device, vibration of the equipment in the image capture device's 104 field of view, or weather such as wind, snow, or hail. In various embodiments, the image stabilization step may be the first step of a process of detecting one or more fluid levels and/or calculating volumes. In some embodiments, the image stabilization step may be optional.

The frame registration engine 204 may apply a phase cross-correlation function to multiple pairs of offset video or image frames. Phase correlation estimates the relative translative offset between similar images or other data sets. The frame registration engine 204 may utilize frequency-domain data representation (e.g., using fast Fourier transforms).

The frame registration engine 204 may further pass frames to the frame engine 206. The frame registration engine 204 may pass the original frame at time t−2 along with stabilized pairs to the frame engine 206. For example, the frame registration engine 204 may apply phase cross correlation (e.g., the phase_cross_correlation function from the scikit-image library with upsample_factor=4 and overlap_ratio=0.95) to frame pairs (t−2, t−1) and (t−2, t) (for frames with index t).

The frame engine 206 may classify objects within the bounding boxes or non-rectangular, polygonal shapes using any number of SVMs. The frame engine 206 may create segmentation masks.

In various embodiments, the AI engine 208 may receive the image sets from the frame engine 206. The AI engine 208 may assess one or more of the images to identify objects and/or regions of interest (RoI) using a region proposal network (RPN) and score potential bounding boxes or non-rectangular, polygonal shapes (e.g., using a cls layer for scores and a reg layer for coordinates).

The AI engine 208 may apply any number of models to assist in proposing regions of interest, scoring RoIs, object classification, creating segmentation masks, and/or identifying different areas indicating movement within the image. For example, the Frame engine 206 may utilize models to create segmentation masks associated with qualifying regions of interest (using a CNN).

In some embodiments, the AI engine 208 may utilize models to create segmentation masks (e.g., associated with boxes or non-rectangular, polygonal shapes) within an image as indications of stored fluid and/or fluid levels (e.g., indications in an image of temperature associated with stored fluid and/or a fluid level). The AI engine 208 may also use segmentation mask criteria to assist in limiting the objects of interest in the image. The segmentation mask criteria may identify characteristics of an RoI, bounding box, or non-rectangular, polygonal shape that are required to be satisfied to identify a stored fluid and/or fluid levels. The segmentation mask criteria may include, for example, a range of sizes. In another example, the segmentation mask criteria may include a range of shapes. The method is further discussed herein.

The AI engine 208 may utilize models to create segmentation masks, to label or categorize objects in regions as stored fluid and/or fluid levels.

The AI engine 208 may be configured to identify stored fluid and/or fluid levels associated with segmentation masks. The AI engine 208 may utilize models to identify stored fluid and/or fluid levels associated with the segmentation mask. The AI engine 208 may be configured to identify the objects that also satisfy the segmentation mask criteria. In various embodiments, the AI engine 208 identifies each object within different RoIs and/or segmentation masks as different stored fluid and/or fluid levels.

A training engine (not depicted and may be at the fluid monitoring system 102 and/or other digital device) may utilize at least a portion of a training set of images and/or segmentation masks to train the AI modeling system to assist in identifying regions of interest within the image as being stored fluid and/or fluid levels for creating segmentation masks and/or categorize segmentation masks (e.g., non-rectangular, polygonal boxes) as stored fluid and/or fluid levels. The training engagement may utilize another portion of the training set to test to results of the AI modeling system.

The training engine may utilize Hyperlabel to create a training set. The training set may be used to train a network such as the extractor (of regions), classifier, and the regressor for improved fitting of bounding boxes/non-rectangular, polygonal shapes to objects. Hyperlabel is a software application that enables users to draw shapes (e.g., non-rectangular, polygonal shapes or rectangular boxes) and/or label the shapes (e.g., categorize) in an image. For example, users may draw shapes (e.g., non-rectangular, polygonal shapes) around different stored fluid and/or fluid levels. Similarly, the users may label non-rectangular, polygonal shapes of an image as being stored fluid and/or fluid levels.

In some embodiments, a user may draw shapes around moving objects that are not stored fluid and/or fluid levels and categorize them as pipes, heat sources, cold sources, workers, birds, or common objects that may be present or caught moving across images. Utilizing that information, the AI engine 208 may identify stored fluid and/or fluid levels and exclude other objects as being previously identified objects that are not stored fluid and/or fluid levels using the training.

The training set may be used to train the AI system. A loss function may be the combination of the class and intersection-over union of the guess of the AI engine 208. The loss function may utilize a gradient descent.

The segmentation mask criteria may include any kind of criteria that assists in the identification of a shape as being stored fluid (e.g., cohering to a shape of a part of a fluid tank) and/or fluid level (e.g., being a specific orientation relative to the stored fluid and also limited by the shape of the storage tank). In some embodiments, the fluid monitoring system 102 may be configured to track fluid and/or fluid levels as the oil enters or leaves a tank through equipment, pipes, fittings, valves, and/or the like.

The image capture device 104 may be positioned such that the field of view is directed to parts of a pipeline station. The segmentation mask criteria may include criteria that fit an expected non-rectangular, polygonal shape for the size and general shape (or shape sizes) of different stored fluid and/or fluid levels. If a non-rectangular, polygonal shape of an object in an image does not fit the segmentation mask criteria, the fluid monitoring system 102 may flag the object in future images to determine if the non-rectangular, polygonal shape in the image changes (e.g., separates to any number of non-rectangular, polygonal shapes that fit the segmentation mask criteria). If a bird, trash, static object with different temperature, or person moves across the field of view of the image for example, the fluid monitoring system 102 may not flag the image since the moving object does not fit the segmentation mask criteria.

In some embodiments, the frame engine 206 may identify regions of interest of an image based on one or more models. The region of interest (RoI) may include qualities that make it a proposed region of interest based on qualities that satisfy a selection criteria, score, segmentation mask criteria and/or any number of models. The frame engine 206 may identify regions using non-rectangular, polygonal shapes and/or draw non-rectangular, polygonal shapes around qualifying proposed regions of interest based on the selection criteria, score, segmentation mask criteria and/or any number of models. Similarly, in some embodiments, the frame engine 206 may categorize or otherwise label objects in or associated with RoIs as stored fluid and/or fluid levels based on any criteria including or not including the segmentation mask criteria and/or any number of models.

In some embodiments, the AI engine 208 uses ResNet 101+FPN instance segmentation model to generate a list of detection areas (as binary masks) and detection confidences (floating point numbers between 0 and 1). The AI engine 208 may discard all detections with a confidence below 0.5, and convert the detection area masks into encapsulating polygons.

The fluid detection engine 210 may receive the results from the AI engine 208 and determine a fluid level of a storage tank depicted in an image. In some embodiments, the fluid detection engine 210 determines an amount of fluid stored in a storage tank based on the image. In various embodiments, the AI engine 208 is trained to identify a fluid level of an image based on orientation, position, and shape of changes of color or greyscale in an image (e.g., the changes in color indicating a temperature shift and the shape indicating a line associated with the contents of a storage tank).

In various embodiments, the fluid detection engine 210 may determine the position of a fluid level (e.g., top of the fluid) contained within an image of a storage tank based on the information provided by the AI engine 208. The AI engine 208 may provide indications of positions of changes of temperature (e.g., based on changes of color or grayscale of the image). The fluid detection engine 210 may determine the fluid level based on the indications of positions of changes of temperatures.

In various embodiments, the fluid detection engine 210 may determine a quantity of fluid stored in the fluid storage tank depicted in an image. For example, the AI engine 208 may provide indications of changes in temperature of a storage tank. In some embodiments, the AI engine 208 may associate a portion of an image and/or other information associated with change(s) of color (or brightness) of a storage tank with fluid contained within the storage tank. In some embodiments, the AI engine 208 indicates a portion of the image and/or other information associated with change(s) of color of a storage tank indicating that no fluid contained within the storage tank.

The fluid detection engine 210 may determine, based on the image and/or information from the AI engine 208, a volume of the fluid stored in the storage tank. For example, the fluid detection engine 210 may utilize statistical references and/or area of color indications (e.g., lighter color) indicating fluid (or lack of fluid) contained within the storage tank. Further, the fluid detection engine 210 may utilize the known storage capacity of the storage tank, historical information of stored fluid, training data of known images associated with known stored fluid, and/or the like to determine fluid stored in the storage tank (e.g., percentage capacity of fluid, percentage capacity available in the storage tank, and/or quantity of fluid stored in the storage tank). In various embodiments, the fluid detection engine 210 determines percentage capacity of fluid, percentage capacity available in the storage tank, and/or quantity of fluid stored in the storage tank and provides two or more different measurements to a graphical user interface (e.g., with or without the user's selections on the graphical user interface).

The fluid tracking engine 212 may track changes of percentage capacity of fluid, percentage capacity available in the storage tank, and/or quantity of fluid stored in the storage tank over time. In various embodiments, the fluid tracking engine 212 tracks changes of one or more of these metrics to determine a rate of change. The percentage capacity of fluid, percentage capacity available in the storage tank, and/or quantity of fluid stored in the storage tank may compare changes to historical information (e.g., changes over similar times of day, over similar days, similar weeks, similar seasons, and the like). If the fluid tracking engine 212 determines a significant rate change compared to the historical information or as compared to a rate threshold (e.g., set by a user), then the alert engine 220 may provide an alert or notification to the user.

The fluid tracking engine 212 may store evaluations of changes of percentage capacity of fluid, percentage capacity available in the storage tank, and/or quantity of fluid stored in the storage tank over time as well as the information relied upon for such evaluations (e.g., images from the image capture device 104, information from the AI engine 208, information from the fluid detection engine 210, and the like) in the fluid datastore 214.

The fluid leak volume estimator engine 216 may determine loss of fluid due to changes in the rate of storage from the fluid tracking engine 212. In various embodiments, the fluid tracking engine 212 may identify significant changes in the rate of stored fluid (e.g., indicating a loss of fluid). Based on the significant rate change (e.g., based on a comparison of the tracked fluid to a rate threshold, historical information, and/or indications of the user that a fluid leak has occurred), the fluid leak volume estimator engine 216 may determine an amount lost based on changes of fluid contained in the storage tank depicted in images.

In various embodiments, the fluid detection engine 210 may determine changes of percentage capacity of fluid, percentage capacity available in the storage tank, and/or quantity of fluid stored in the storage tank based on images and information received from the AI engine 208. The changes of percentage capacity of fluid, percentage capacity available in the storage tank, and/or quantity of fluid stored in the storage tank may be stored in the fluid datastore 214.

Based on the known capacity of a storage tank, statistical modeling, and/or training based on known information, the fluid leak volume estimator engine 212 may determine an amount of fluid that should be depicted in the images and the difference between an amount of fluid that is depicted in the images at different times and/or dates. As such, the fluid leak volume estimator engine 216 may determine the amount of fluid lost over a period of time.

In various embodiments, once the fluid tracking engine 212 determines a fluid leak has been classified (e.g., through a rate change, indication by a user, or determination by the AI engine 208, the fluid tracking engine 212 may determine a location of storage tanks related to the leak (e.g., those fluid storage tanks that indicate rate changes), determine a duration of the fluid leak (e.g., based on multiple images taken over time of the same field of view), estimates of volume lost due to the fluid leak, and/or rate of volume lost.

The fluid tracking engine 212 may determine the location of each fluid leak detected by the AI engine 208 and a map the location in the fluid station. Each piece of equipment, such as pressure vessels, heat exchanges, storage tanks, pump, and/or compressors in the fluid station may be given a particular designation (e.g., an identifier), such as an equipment identification label (e.g., words, numbers, and/or a combination of both). For example, each fluid storage tank may be associated with a different identifier.

Once a fluid leak is classified as such by the AI engine 208, fluid tracking engine 212, or fluid volume estimator engine 216, the fluid tracking engine 212 may associate the change of rate in one or more images with one or more components (e.g., storage tanks) of the fluid station. For example, the fluid tracking engine 212 may identify the pixels of the border of the colored object in an image and determine proximity or overlap to pixels to a storage tank and/or of any number of fluid components. The fluid tracking engine 212 may make location predictions based on overlap of the lighter or darker pixels and/or proximity of pixels to pixels of the fluid equipment. The fluid tracking engine 212 may then provide one or more identifiers of the fluid storage tanks and/or fluid components to the user interface 218 as identifying possible leaking components or components impacted by a leak.

In some embodiments, the fluid storage facility, equipment, etc. may be associated with coordinates to assist in identifying a location. The fluid tracking engine 212 may associate a detected leak (e.g., identified by the AI engine 208) with a location (e.g., equipment identifier and/or coordinates) to assist in determining a location of a fluid leak. In some embodiments, satellite imagery of the fluid facility may be used to create or retrieve coordinates of the fluid facility. Equipment may be associated with different coordinates and the equipment in each field of view of each image capture device 104 may be associated with coordinates (similar to the identifiers discussed above). As similarly discussed, the fluid tracking engine 212 may determine location of the fluid leak and/or stored fluid based on pixels of the brightness or color (e.g., lighter or darker greyscale) of objects relative to pixels of fluid components and then retrieve coordinates of those fluid components closest and/or overlapped by the pixels indicating temperature change impacted by fluid to provide to the user interface 218.

In some embodiments, the fluid tracking engine 212 determines the start of the unexpected change in volume and/or duration (e.g., length of time) of the unexpected change. As discussed herein, images may be taken over time (e.g., a series of images taken over time). Metadata may be associated with the images that identify images and/or image sets with time (e.g., from a particular reference clock).

When the AI engine 208 determines a fluid leak in any number of images, the fluid tracking engine 212 may assess the images and/or other images that depict the same area or equipment that is proximate to the detected fluid leak (e.g., proximate to the pixels representing the fluid leak). The fluid tracking engine 212 may assess each image based on the AI engine 208 classifications to identify a time before the fluid leak began (or was very low) as well as how long the leak has been present.

For example, the fluid tracking engine 212 determines that a particular fluid leak started at time t if the fluid tracking engine 212 determines that a rate of change of stored fluid suggests a leak (or an unanticipated change). The fluid tracking engine 212 may send a request to the fluid datastore 214 to update a fluid leak entry associated with the particular fluid leak of particular equipment.

In some embodiments, the fluid volume estimator engine 216 may receive a request from the fluid tracking engine 212 to estimate the volume fluid escaping at a particular time or over time. The fluid leak volume estimator engine 216 may estimate the volume of fluid by estimating a planar area occupied by the fluid detected by the AI engine 208 at time t and estimating the pixel value of the pixels that represent the fluid in an image captured by the image capture device at time t. These values may be used to determine an estimate of the volume of the fluid leak over time.

As discussed herein, the fluid leak volume estimator engine 216 may estimate the volume of fluid in any number of images by estimating a planar area occupied by the fluid detected by the AI engine 208 at time t of each image and estimating the pixel intensity value of the pixels that represent the fluid in each image captured by the image capture device at different times. These values may be used to determine an estimate of the volume of the fluid leak at specific times. Further, the fluid leak volume estimator engine 216 may estimate a total fluid lost during times captured by the images based on estimates of volume.

In some embodiments, the fluid leak volume estimator engine 216 may also determine when the fluid leak began or began to be sufficiently serious (e.g., by comparing estimates of fluid volume to a predetermined fluid volume threshold). For example, the fluid leak volume estimator engine 216 may evaluate each image and determine when the fluid leak was not present or was present but not detected. In some embodiments, the fluid leak volume estimator engine 216 may compare an estimate of a volume of a fluid leak in one image to determine a degree of seriousness and/or determine when to notify a user of the fluid leak (e.g., notifying or providing an alarm when the volume of a suspected fluid leak is above a particular threshold).

Weather may play a factor in determining the temperature of fluid and thereby may change the pixel intensity of IR images. For example, the ambient temperature, wind speed, and wind direction may have an effect on the dispersal rate of temperatures. Regardless of changes in outside temperature, it will be appreciated that the fluid inside the fluid storage tank will maintain or change temperature in a manner that is different that the temperature on the outside of the storage tank. As such, a differential may still be determined from IR images.

It will be appreciated that the fluid datastore 214 may contain original images taken by the image capture device(s) 104, stabilized images from the frame registration engine 204, indications of changes in temperature associated with fluid levels of storage tanks from the AI engine 208, estimates of volume and/or percentage capacity of fluid (or available capacity) from the fluid detection engine 210, and fluid volume tracking from the fluid tracking engine 212 over time. Based on the contained information, the fluid leak volume estimator engine 216 may retrieve any or all information for one or more storage tanks from the fluid datastore 214 for any period of time (e.g., the period of time provided by the user and/or indicated when the first significant change of rate is detected by the fluid tracking engine 212) to estimate potential volume of fluid that may have been lost.

It will be appreciated that the fluid leak volume estimator engine 216 may store any estimates of loss or potential loss within the fluid datastore 214.

The user interface 218 may provide access to information stored within the fluid datastore 214. In various embodiments, the user interface 218 may provide information to allow a user device to depict a user interface, including images of the storage tanks (e.g., captured by the image capture device(s)), calculated volumes associated with the different storage tanks, fluid levels, changes in volume over time, alerts, and/or the like.

The user interface 218 may provide images and/or depictions of fluid storage tanks of a fluid station. For example, the user interface 218 may provide images from the IR image capture devices and/or visual image capture devices of fluid storage tanks. The user interface 218 may provide indications of stored fluid (e.g., indications of fluid levels and fluid based on temperature changes within an image of one or more storage tanks), indications of rates of change over time (e.g., a default period of time or a duration of time selected by the user), volume of fluid contained within each fluid storage tank depicted in the image, identifiers of fluid storage tanks, indications of percentage of fluid storage tank filled with fluid and/or available capacity of a storage tank, and/or notifications of possible leaks. The user interface 218 may provide the information and/or images directly (e.g., as a webserver providing the information on a web page) or indirectly (e.g., to an application or browser on a user device over a network).

In various embodiments, the user interface 218 may provide access to the fluid datastore 214 and/or provide information regarding stored fluid, lost fluid, rate of change of fluid, metrics and images used to determine stored fluid within an IR image, metrics and images used to determine volume of fluid in a storage tank, rate changes of fluid storage, indications of notification, and/or the like. As such, the determination of fluid, amount of fluid stored, changes, and the like may be stored and a record created and/or maintained for tracking, regulatory compliance, disaster planning, and/or environmental safety.

The input engine 202 or user interface 218 may store and relate information that is associated with a particular fluid leak. Once detected, the input engine 202 or user interface 218 may collect images of the area of the fluid leak, collect estimates and/or evaluations of any part of the fluid leak, configurations of the AI system, outputs, and the like and store a report (or the combined information) in the fluid datastore. As such, a user or government entity may access the fluid datastore to browse or retrieve the images or information to confirm the existence of the fluid leak, proper functioning of the fluid monitoring system 102 (e.g., for reliability), the precision of the fluid monitoring system 102, the possible impact of escaped fluids, adherence to rules and regulations of the system and/or the fluid station and/or the like.

The fluid datastore 214 may be any data structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The fluid datastore 214 may store a stream from the image capture device 104. The fluid datastore 214 may also store the segmentation masks/non-rectangular, polygonal shapes identified in different images and track which shapes are associated with stored fluid over time. The fluid datastore 214 may track the stream, images, processed images, and the like for any number of storage tanks, fluids of storage tanks, image objects associated with fluid and/or temperatures related to fluid storage from any number of image capture devices 104 over any number of refinery equipment.

The notification engine 220 may provide notifications or alerts to any digital device. For example, the notification engine 220 may provide a notification or alert if there are unexpected changes to volume (e.g., based on user thresholds or historical information), possible leaks, or the like. The notification engine 220 may provide the alert or notification to any digital device (e.g., user device) or user interface. In some examples, the notification engine 220 may provide notifications or alerts by text, SMS, email, phone calls, and/or the like.

It will be appreciated that utilizing the fluid monitoring system 102 as discussed herein may greatly reduce errors caused by manual detection (e.g., manual detection often misses measurements of fluid stored, fluid levels, volume stored, and/or rates of change of stored fluids because manual or prior art measurements are not constantly available, lack monitoring, lack tracking and information/image collection over time, and the like). Further, detecting or monitoring fluid station equipment may be performed continuously. Further, employees (e.g., fluid station employees) may stay warm as the need to go outside decreases. Similarly, employee safety is improved by keeping employees out of areas with possible fluid is stored or leaking which may be unhealthy and/or create dangerous environments.

Moreover, manual and preexisting methods for fluid volume, rate of change, and fluid level detection is inadequate, error prone, reliant on devices that are inaccessible if they fail, and provide another vector of error. As further follows, the prior art may be limited to estimates of fluid volume and indications of leaks partially or completely relying on measurements of fluid against the expected amount of fluid (as opposed to measuring directly the volume contained within a fluid tank using IR imagery to detect fluid levels based on temperature). As further follows, preexisting methods are insufficient to determine fluid volume, fluid levels, rate of fluid volume change, and fluid leaks.

Figure 3:
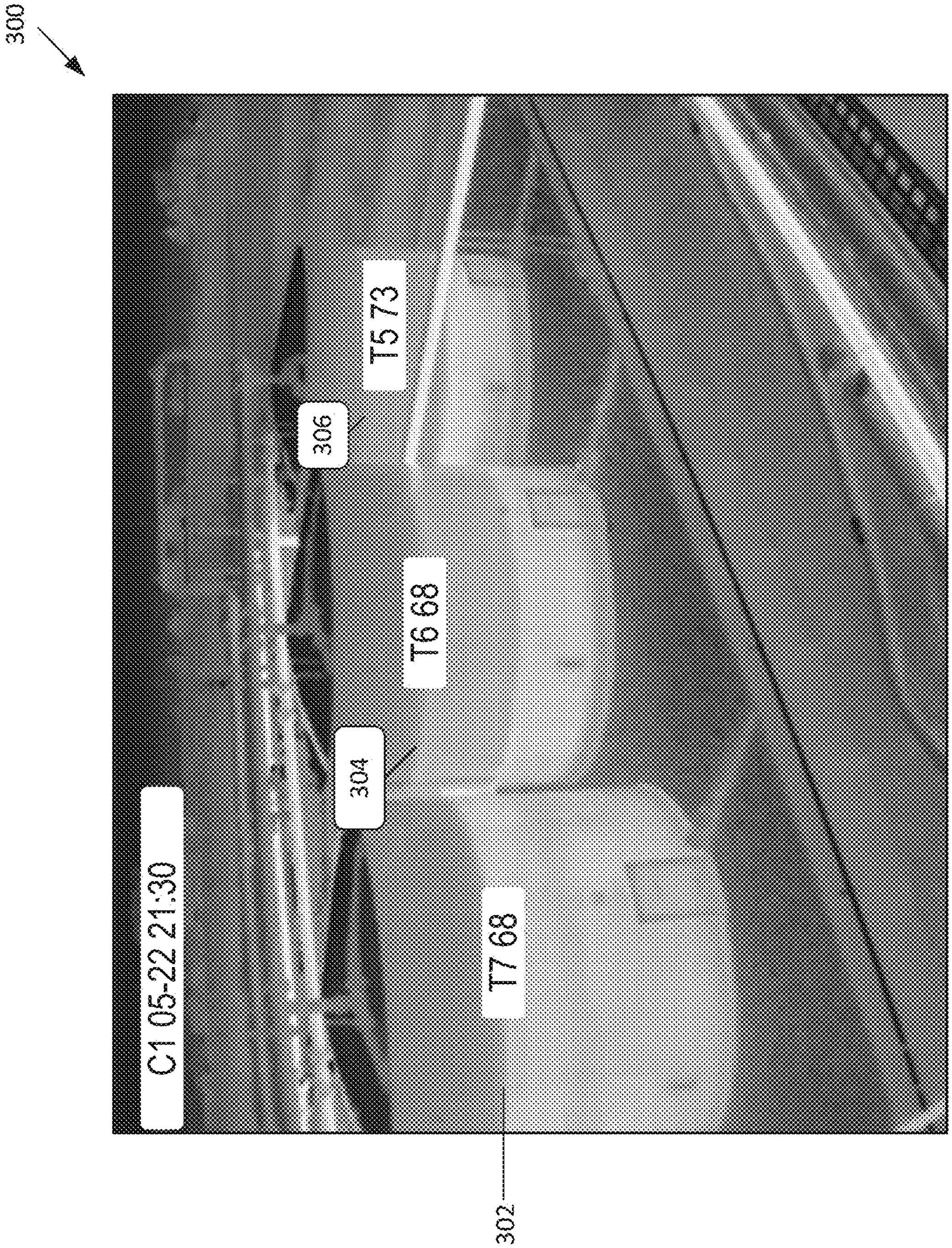
FIG. 3 depicts an image of a fluid station in some embodiments.

FIG. 3 depicts an image 300 of a fluid station in some embodiments. The fluid station image 300 includes three fluid storage tanks T5, T6, and T7. In this example, an image capture device 104 takes an infrared image 300. The image 300 further includes a field of view label (e.g., "C1") as well as a date of the image (e.g., 05-22) and time (e.g., 21:30) of the image. In some embodiments, the image 300 may be taken by an IR image capture device. The image, in some embodiments, may be displayed on a user interface.

The infrared image 300 indicates temperature. For example, fluid storage tanks T5, T6, and T7 each show lighter areas associated with different temperatures. The darker area of the exterior of the tank indicates regions of each tank that are not in contact with stored fluid. Lighter areas in the infrared image are associated with regions of each tank that are in contact with stored fluid.

Depictions of variations in temperature may be sufficient to indicate a fluid level (e.g., how full the tank is) within the storage tank. In this example, fluid storage tank T7 has a fluid level of 302. As such, the fluid monitoring system 102 may determine an amount (e.g., quantity or percentage) of fluid stored within the tank. In this example, the fluid monitoring system 102 determines that the fluid storage tank T7 is 68% full. The fluid monitoring system 102 may further generate an image and provide the image on a graphical user interface (e.g., to be provided to the user device 104) depicting the image 300 including the fluid level 302 and/or the amount of fluid within the fluid storage tank (e.g., fluid storage tank "T7 68").

Similarly, fluid storage tank T6 has a fluid level of 304. In this example, the fluid monitoring system 102 determines that the fluid storage tank T6 is 68% full (similar to fluid storage tank T7). The fluid monitoring system 102 may include that information in the image for the graphical user interface depicting the image 300 including the fluid level 304 and/or the amount of fluid within the fluid storage tank (e.g., fluid storage tank "T6 68").

Further, fluid storage tank T5 has a fluid level of 306. In this example, the fluid monitoring system 102 determines that the fluid storage tank T5 is 73% full. The fluid monitoring system 102 may include that information in the image for the graphical user interface depicting the image 300 including the fluid level 306 and/or the amount of fluid within the fluid storage tank (e.g., fluid storage tank "T5 73").

It will be appreciated that the fluid monitoring system 102 may determine and/or provide depictions of an amount of stored fluid in gallons, liters, or any measurements. Further, the graphical user interface may allow the user to change how they would like to receive information. For example, the user may control the interface and/or calculations such that the amount of stored fluid be depicted as a percentage of the storage capacity of each tank and/or a quantity (e.g., 312 gallons of stored fluid).

Figure 4:
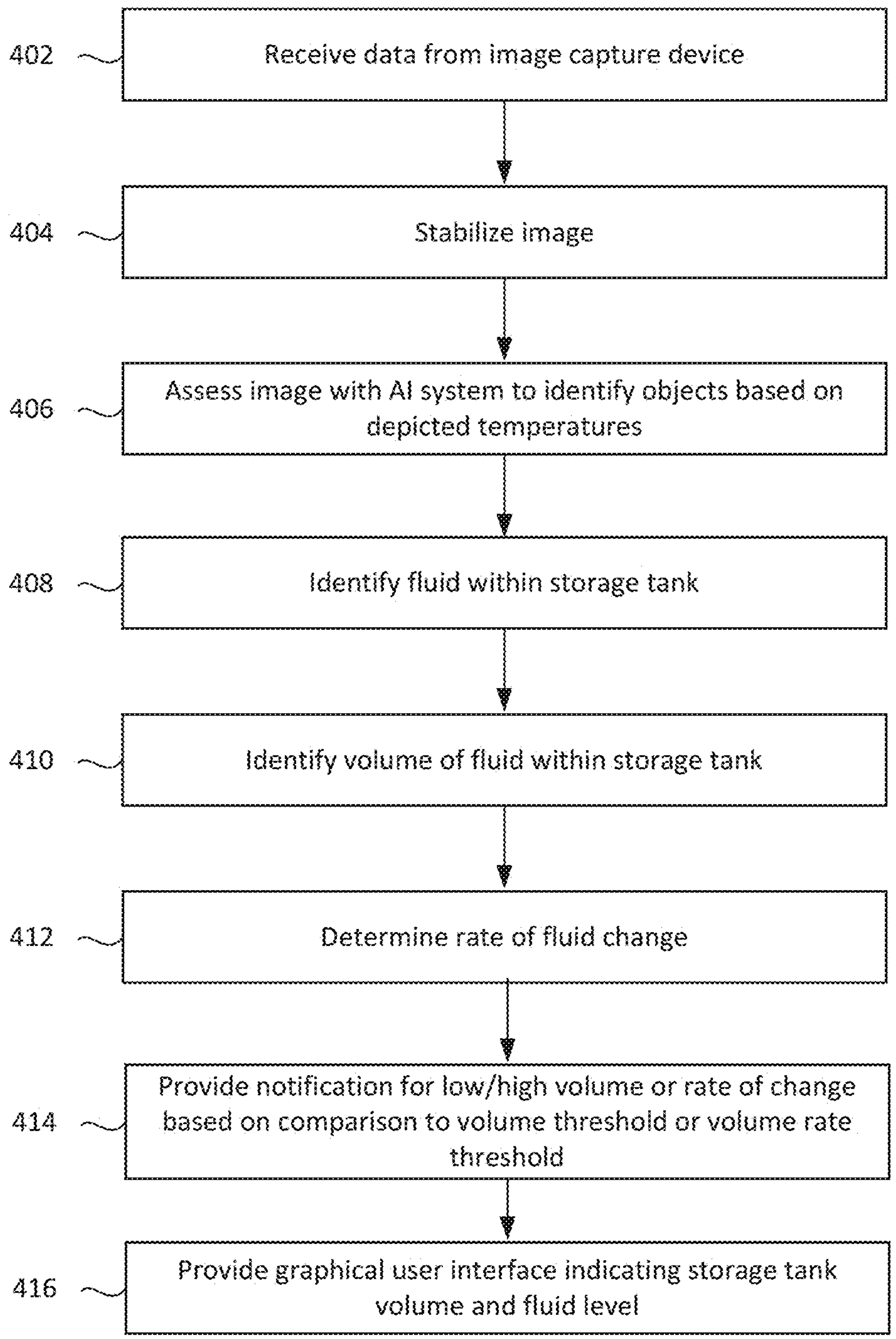
FIG. 4 is a flowchart depicting a process of detecting stored fuel and volume of stored fuel.

FIG. 4 is a flowchart depicting a process of detecting stored fuel and volume of stored fuel. In step 402, the image capture device 104 captures one or more images of one or more storage tanks. The image capture device 104 may capture images in the infrared spectrum thereby capturing different temperatures based on changes of light intensity (e.g., changes in greyscale). There may be any number of image capture devices 104 capturing any number of storage tanks in any number of different field of views.

Each of the image capture devices 104 may provide images to the fluid monitoring system 102.

In some embodiments, the image capture devices 104 capture image streams (e.g., video and/or any number of images). The input engine 202 receives the images and/or stream from an image capture device 104 that has a particular field of view of a portion of the fluid station. In various embodiments, the image capture device 104 is stationary and the field of view does not intentionally move. The image capture device 104 may provide images, video, or a stream at any speed. In some examples, the image capture device 104 provides a stream at 10 fps.

In one example, the image capture device 104 is an IR device and is positioned with a field of view of storage tanks, pipes, and/or pumps. In various embodiments, the image capture device 104 is an IR camera (e.g., an FLIR camera), which detects the infrared spectrum (e.g., heat) and captures images as a digital image. Digital images outputted by IR cameras may be monochromatic images, with pixels representing an intensity of heat measured by the IR camera. For example, image 300 (which may be presented in a user interface) depicted in FIG. 3 shows an area of a storage tank that faces that sun and therefore may be warmer than another area of the storage tank. Due to the difference in the heat signature between the two areas, the area facing the sun may appear to be brighter or lighter than the area not facing the sun. Similarly, fluids contained within the storage tanks affect heat absorption and thereby may appear from the IR images taken of the storage tanks.

In step 404, the frame engine 206 may stabilize the video or images. The frame engine 206 may receive the video or image frames from the frame registration engine 204. The frame engine 206 may apply a fully convolutional network (FCN) to each RoI of an image to predict a segmentation mask in a pixel to pixel manner. This process is different than Faster R-CNN which was not designed for pixel-to-pixel alignment between network inputs and outputs. For example, Faster R-CNN utilizes RoIPool as the core operation for attending to instances and performs coarse spatial quantization for feature extraction. To correct misalignment, the frame engine 206 may apply a quantization-free layer that preserves spatial locations (i.e., RoIAlign discussed herein). This correction may significantly improve segmentation mask accuracy relative to Faster R-CNN.

In step 406, the AI engine 208 assess the image to identify objects based on depicted temperatures. As discussed herein, the frame engine 206 may decouple segmentation mask and class prediction. The frame engine 206 may predict a binary segmentation mask for each class independently without competition among classes and rely on the network's RoI classification to predict the category. FCNs may not perform as well because they perform per-pixel multi-class categorization which couple segmentation and classification.

The frame engine 206 may process an image using a region proposal network (RPN) to propose candidate object bounding boxes by sliding a network over a convolutional feature map outputted from a previous convolutional layer. In various embodiments, the frame engine 206 utilizes non-rectangular, polygonal shapes rather than bounding boxes to improve accuracy.

The frame engine 206 may extract features using RoIAlign from each candidate box (or candidate non-rectangular, polygonal shape) and performs classification and (bounding box or non-rectangular, polygonal shape) regression. In parallel to predicting the class and offset, the frame engine 206 may output a binary segmentation mask for each RoI (this is in contrast to systems where classification depends on segmentation mask predictions).

During training, the training engine may define a multi-task loss on each sampled RoI a multi-task loss on each sampled RoI may be defined as $L=L_{cls}+L_{box}+L_{mask}$. The segmentation mask branch has a $Km^2$ dimensional output for each RoI. In some embodiments, the definition of the $L_{mask}$ may allow the training engine to generate a segmentation mask for every class without competition among classes (e.g., this decouples the segmentation mask and class prediction common when applying FCNs).

A segmentation mask may encode an input objects spatial layout. As a result, extracting the spatial structure of segmentation masks may be addressed by pixel-to-pixel correspondence provided by convolutions.

The segmentation masks may be non-rectangular, polygonal boxes. The frame engine 206 may then apply models to identify the segmentation masks within the image as representative of stored fluid.

In step 408, fluid stored in the storage tank(s) are identified. In various embodiments, the AI engine 208 may review the segmentation masks and classify any number of the segmentation masks to identify fluid contained within one or more storage tanks depicted in the video or image(s). Any number of the segmentation masks may be classified as containing an image of temperature corresponding to fluid within the storage tank.

In various embodiments, the AI engine 208 may be trained to recognize intensities (or ranges of intensities) of pixel brightness corresponding to fluid within a tank. In various embodiments, the AI engine 208 may utilize historical information (e.g., classifications of pixel intensities associated with fluid within a tank) for specific times of days, specific days, specific weeks, specific months, or specific seasons. In one example, pixel intensities (e.g., greyscale color) of an IR image are associated with temperature.

In addition or instead of using historical information, the AI engine 208 may assist by comparing uniform pixel densities in a specific portion of an image (e.g., the image of the storage tank(s) may not change so the AI engine 208 may be trained to assess specific areas within an image or bounding boxes of interest) to classify stored fluids. In some embodiments, the AI engine 208 may additionally or alternately identify and classify stored fluids based on comparison of pixel intensities to the rest of the image and/or the shape of the pixel intensities. It will be appreciated that the shape of the pixel intensities corresponding to stored fluids will be consistent throughout any number of images of the same equipment.

In various embodiments, the AI engine 208 identifies portions of the image associated with stored fluid and the fluid detection engine 210 identifies the stored fluid based on the information and/or images from the AI engine 208. In some embodiments, the AI engine 208 identifies the stored fluid based on the information and/or images.

In various embodiments, the AI engine 208 and/or fluid detection engine 210 identifies the fluid level of stored fluid based on information and images. The fluid level is the "top" of the fluid stored within the storage tank. The AI engine 208 and/or fluid detection engine 210 may identify contrast of intensity at a line at the top of the pixel intensities associated with stored fluid within the fluid storage tank. The AI engine 208 and/or fluid detection engine 210 may determine fluid level based on position of the line of intensity contrast (e.g., within the storage tank), shape or length of the line of intensity contrast, and/or proximity to the pixel intensity associated with stored fluid.

In various embodiments, the AI engine 208 identifies portions of bounding boxes in regions of interest associated with the position of possible stored fluid and fluid levels. Based on previous training, the AI engine 208 may classify portions of the image based on pixel intensity relative to other pixels in the image or other pixels in the bounding box, shape of continuous pixel intensity, consistency of pixel intensity, and/or the like. Based on the classification, the AI engine 208 and/or fluid detection engine 210 may determine the pixel intensities or portion of the image associated with stored fluid. Similarly, based on a line of pixel intensity contrast of the pixel intensities associated with the stored fluid as well as the position and orientation of the line of contrast, the AI engine 208 and/or fluid detection engine 210 may identify the fluid level.

In some embodiments, the fluid detection engine 210 may determine an amount or volume of the stored fluid contained in the storage tanks based on the information and/or images in step 410. In various embodiments, the fluid detection engine 210 associates an amount of fluid stored within a storage tank based on the fluid level of the stored fluid (e.g., the top of the fluid). The fluid detection engine 210 may estimate an amount stored based on the fluid level. For example, the fluid detection engine 210 may estimate volume based on a measure of the fluid level. In various embodiments, the fluid detection engine 210 may utilize the fluid level and performs a level regression to calculate a relative fill level based on the height of the tank. For example, volume may equal $V=\pi r^2 h$ where V is volume, r is radius of the tank, and h is the volume of the storage tank.

Figure 5:
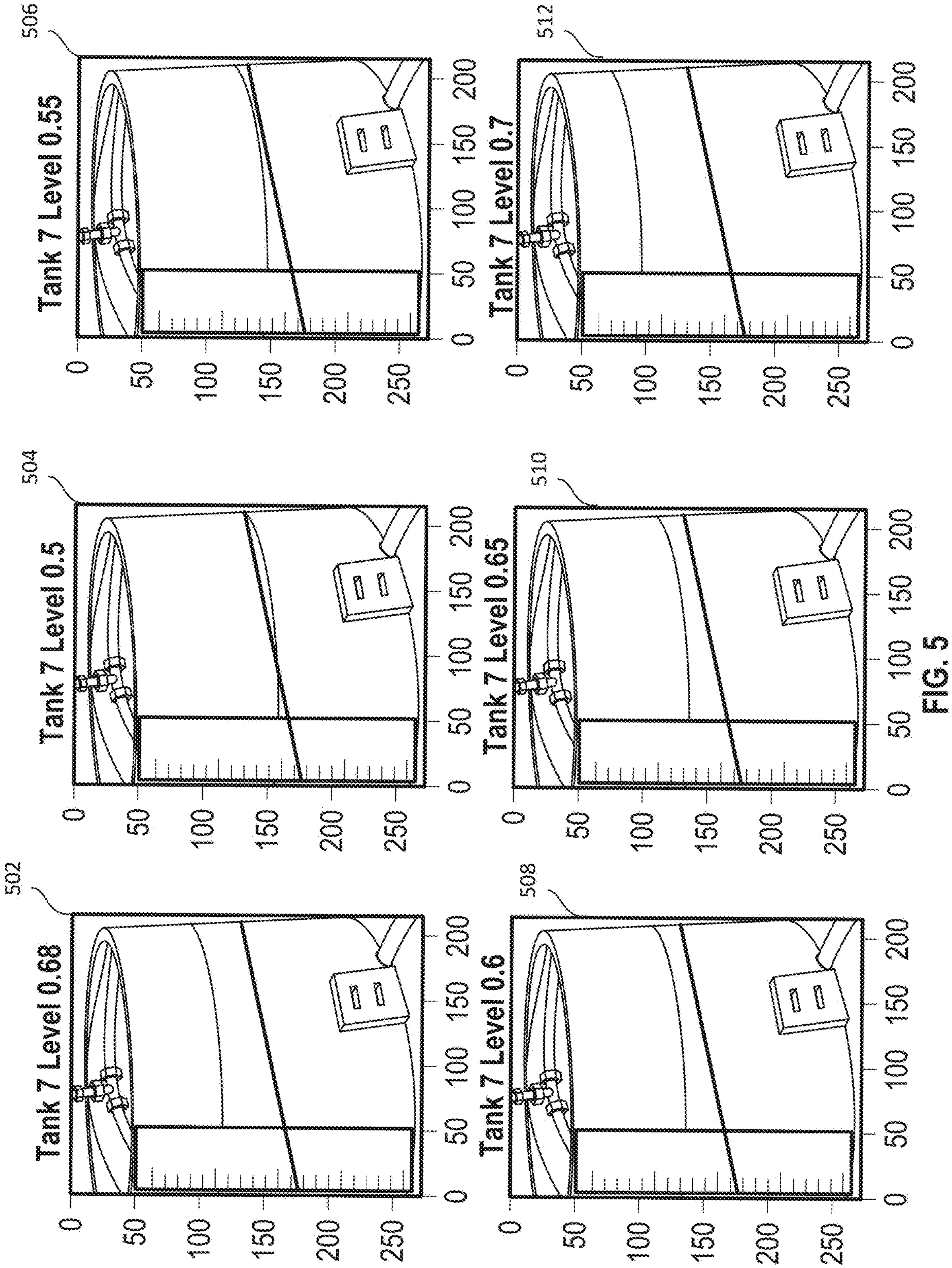
FIG. 5 depicts six images of a storage tank taken at different times in some embodiments.

One example of fluid volume estimation based on fluid level may be found in FIG. 5. FIG. 5 depicts six images 502-512 of a storage tank taken at different times in some embodiments. In this example, the AI engine 208 and/or fluid detection engine 210 determined the fluid level. The six images 502-512 may be depicted in a graphical user interface. In some embodiments, the graphical user interface may include a scale to assist the user to visualize an amount of the fluid stored within the storage tank (or an amount of capacity available in the storage tank).

In image 502, tank 7 has a fluid level corresponding to approximately 68% full. In image 504 taken at a later time, tank 7 has a fluid level corresponding to approximately 50% full. In image 506, the fluid level corresponds to 55% full. In image 508, the fluid level corresponds to 60% full. In image 510, the fluid level corresponds to 65% full. In image 512, the fluid level corresponds to 70% full.

In some embodiments, these are estimates to indicate volume and/or available capacity. These estimates may also be used to determine rate of change for detecting unexpected loss, confirm estimated volumes, and/or compare against input and output metrics (e.g., from trucks, pipelines, and/or the like).

In step 412, the fluid tracking engine 212 may track the rate of change of volume estimates over time. In various embodiments, the fluid tracking engine 212 may track estimated volume and fluid level over time. The fluid tracking engine 212 may make comparisons of changes of any of the time series data to determine a rate of change. In various embodiments, a user may configure how the rate of change of the volume is calculated (e.g., through the user interface).

For example, the fluid tracking engine 212 may determine the rate of change by comparing the estimated volume of an image to the estimate volume of the previously captured image. In some embodiments, the fluid tracking engine 212 compares the volume of a first image to a volume of a second image captured 10 minutes prior to the first image. It will be appreciated that the fluid tracking engine 212 may compare any number of fluid volumes over any times to capture significant changes. For example, the fluid tracking engine 212 may compare a current estimate volume to a fluid estimate value calculated one hour previously as well as compare the current estimate volume to a fluid estimate value calculated 10 hours previously. The user may configure a comparison and a rate determination over any number of time periods.

By determining a rate of volume change over a number of different time periods, the user may be able to detect changes that may not appear significant over a short time period but are significant over longer time periods. For example, a slow fluid leak may not make an appreciable difference of the volume of a large, fluid storage tank over ten minutes, but the change may be discernable and significant when compared to the rate of change over 10 hours, 24 hours, and/or the like. The user may configure rate thresholds to trigger alerts over any number of rate calculations for any number of time periods.

In various embodiments, the fluid tracking engine 212 may determine default threshold calculations by determining an expected change in rate over time using historical information. The fluid tracking engine 212 may set default rate thresholds for any time period. The default rate thresholds moving forward (e.g., adding new information over time and/or eliminating older historical information if it is beyond a predetermined time period). The default thresholds may be modified, updated, or deleted by the user.

In step 414, if a rate of change is above or below a rate threshold, the notification engine 220 may provide alerts to the user by sending notifications over the graphical user interface, sending an email, sending a text, making a call, and/or the like. Similarly, if the determined volume of the fluid within the storage tank is above or below one or more volume thresholds (e.g., the storage tank is reaching maximum storage or the storage tank is almost empty), the notification engine 220 may provide alerts to the user by sending notifications over the graphical user interface, sending an email, sending a text, making a call, and/or the like.

In step 416, the user interface 218 may generate or provide a graphical user interface that may be accessible to a digital device (e.g., client system 110). The graphical user interface may include images in real time from the image capture device(s) 104 for any number of different fields of view depicting any number fluid storage tanks. In some embodiments, the graphical user interface may include images after being processed by the fluid monitoring system 102 in real time from the image capture device(s) 104 for any number of different fields of view depicting any number fluid storage tanks.

The graphical user interface may further include metrics of fluid volume (e.g., based on gallons, liters, or the like), available capacity of the storage tank, percentage of the storage tank that is full, and/or percentage of capacity of the storage tank that is available. The graphical user interface may further depict equipment identifiers associated with depicted equipment (e.g., storage tank "T7") that will indicate a location and/or identify the equipment.

The graphical user interface may depict the storage tanks and other equipment in any number of ways. In various embodiments, the graphical user interface may utilize color images from a visual camera while overlaying or adding additional information about the storage tank from the fluid monitoring system 102 (based on IR images). In one example, the fluid monitoring system 102 may overlay an image (e.g., pixel intensities) to indicate location and amount of contained fluid in a color image. In some embodiments, the graphical user interface may depict the IR images of the storage tank(s). In some embodiments, the graphical user interface may provide information regarding any number of storage tanks, volumes, rates of volume change, and/or the like without depicting an image of the storage tank.

The user may utilize the graphical user interface to obtain access to the fluid datastore 214. In some embodiments, the user may obtain records of one or more storage tanks (and/or other equipment) related to images taken over time, bounding boxes identified, inputs to the AI engine 208, outputs of the AI engine 208, training information, classifications, identifications, volume calculations, volumes, rate calculations, rate of volume change, volume thresholds, rate thresholds, and/or the like. Using this information, the user may track information related to leaks, confirm that the system is functioning as expected, confirm operation, provide compliance information, prove regulatory compliance, and/or the like.

In various embodiments, the fluid monitoring system 102 may map infrastructure assets to images captured by image capture devices of the fluid monitoring system according to some embodiments. This may help identify equipment relative to position of a particular site. In one example, one or more image capture devices 104 may be installed in various locations around a fluid storage station. The locations of these image capture devices are chosen so that their field of view includes fluid equipment such as fluid storage tanks, pipes, and/or the like.

For example, the input engine 202 may optionally receive and decode images or video from the image capture device 104. In some embodiments, the received video or image frames may require calibration, which may include adjusting the exposure rate, frame rate, and the like.

Figure 6:
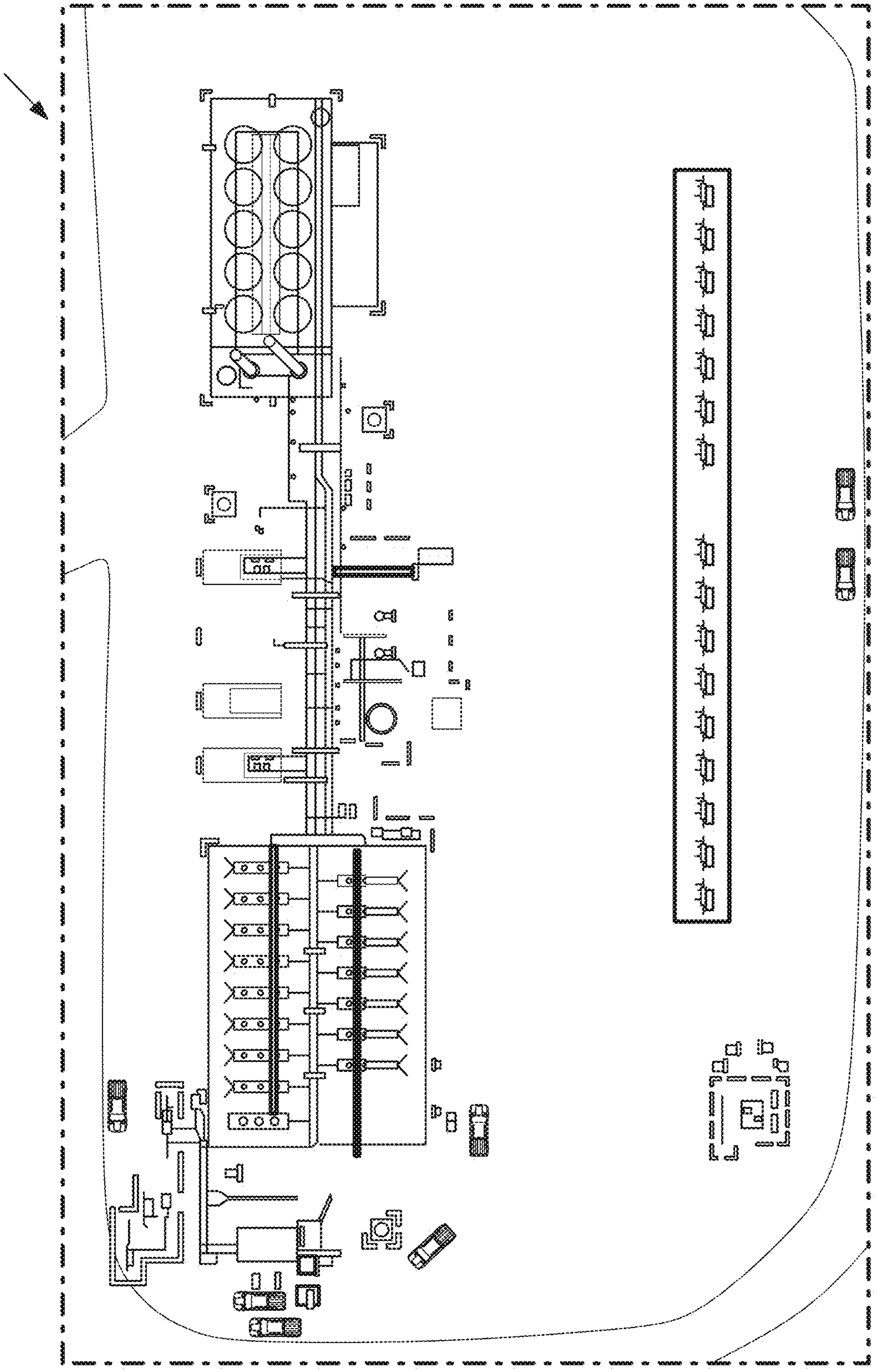
FIG. 6 depicts an example aerial image, which may be useful in determining an overall view of the fluid storage station.

A map or images of the fluid storage station may be captured for associating with equipment in the field of view of the image capture devices. FIG. 6 depicts an example aerial image 600, which may be useful in determining an overall view of the fluid storage station. The aerial imagery may include coordinates of the area including land and equipment of the fluid storage station. The fluid monitoring system 102 may receive the coordinates from satellite, drone, and/or digital device associated with the aerial image 600. The graphical user interface may use equipment identifiers and/or coordinates to associate different parts in the field of views of the image capture devices.

Locations on the example aerial image 600 of FIG. 6 correspond to points or equipment in the field of views of the different image capture devices. For example, the fluid monitoring system 102 may determine the cartesian coordinates of different equipment or points. The fluid monitoring system 102 may receive an input on the user interface of an area of example aerial image 600 of FIG. 6 which corresponds to an area corresponding to equipment or a point.

Figure 7:
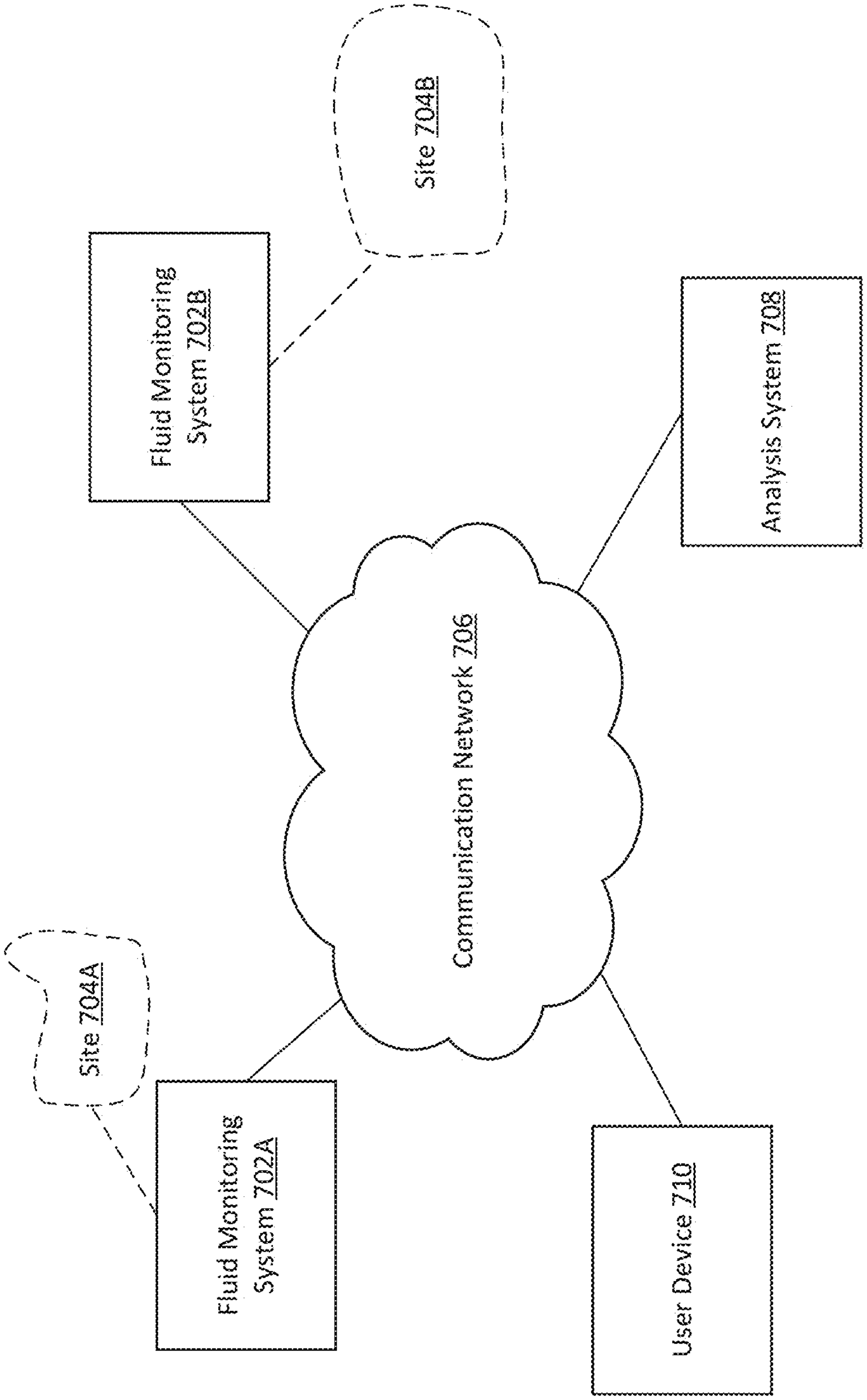
FIG. 7 depicts an environment for analyzing and/or providing notifications regarding different remote sites in some embodiments.

FIG. 7 depicts an environment for analyzing and/or providing notifications regarding different remote sites in some embodiments. The environment includes fluid monitoring systems 702A and 702B that monitor sites 704A and 704B, respectively, an analysis system 708, and a user system 710 that communicate over a communication network 706.

Fluid monitoring system 702A may monitor fluids in fluid storage tanks at site 704A. Site 704A may be a fluid storage facility as discussed herein. Fluid monitoring system 702A may be or include fluid monitoring system 102. Similarly, fluid monitoring system 702B may monitor fluids in fluid storage tanks at site 704B. Site 704B may be a fluid storage facility that is remote from site 704A. Fluid monitoring system 702B may also include the functions of fluid monitoring system 102 for monitoring, analyzing, providing a graphical user interface, and sending notifications regarding stored fluids of site 704B.

In some embodiments, the fluid monitoring systems 702A and 702B may capture images or videos of fluids at the different sites and provide the images and/or video to the analysis system 708 using the communication network 706. The analysis system 708 may perform all or part of the analysis and send results of the analysis (e.g., volume estimations, fluid level indication, information related to rate changes (e.g., the rate changes over a predetermined period of time), and/or notifications to user devices (e.g., user device 710) and/or back to the fluid monitoring system that provided the images and/or video for the particular site.

In this example, one or more of the fluid monitoring systems 702A and/or 702B may not include engines or functionality for analysis (e.g., the fluid monitoring system 702A may not include AI engine 208, fluid detection engine 210, fluid tracking engine 212, fluid datastore 214, fluid leak volume estimator engine 216, and the user interface 218) but rather those engines or functionality may be a part of the analysis system 708. In this example, analysis system 708 may include the AI engine 208, fluid detection engine 210, fluid tracking engine 212, fluid datastore 214, fluid leak volume estimator engine 216, and the user interface 218. The analysis system 708 may perform AI analysis, fluid detection, fluid tracking, storing in the fluid datastore, fluid leak volume estimation, and the like for any number of different fluid monitoring systems and their related sites. The analysis system 708 may provide results of its analysis (e.g., volume estimations, fluid level indication, information related to rate changes, and/or notifications) back to the fluid monitoring system that provided the analyzed images. In some embodiments, the analysis system 708 provides generates or provides a graphical user interface that provides the results of its analysis. For example, the analysis system 708 may be a software-as-a-service (Saas) or platform-as-a-service (PAAS) system or any cloud service that provides graphical user interfaces and/or centralized analysis. A user device (e.g., laptop or smartphone) may be used to access the information stored on the analysis system 708 through the graphical user interface.

For example, a fluid monitoring system 702A may capture images of fluid storage tanks of site 704A. The fluid monitoring system 702A may provide the images to the analysis system 708. In various embodiments, the fluid monitoring system 702A or the analysis system 708 may correct for movement or shaking in the image(s). Further, in some embodiments, the fluid monitoring system 702A or the analysis system 708 may identify bounding boxes (e.g., that may be polygonal-shaped as discussed herein). The analysis system 708 may utilize all or some of the functionality of AI engine 208, fluid detection engine 210, fluid tracking engine 212, and the fluid leak volume estimator engine 216 to determine fluid within the images, calculate volume of fluid (e.g., using information associated with the storage tank in the image), determine fluid level, track calculations of volume, compare rate changes against thresholds, and the like.

In some embodiments, the analysis system 708 includes a centralized fluid datastore similar to that discussed regarding fluid datastore 214 but including information associated with any number of sites. The sites may be commonly owned by one entity or owned by any number of different unrelated entities.

In various embodiments, the analysis system 708 may include a registration engine to create an account that identifiers any number of sites, fluid storage tanks, and/or fluid monitoring systems 102. Each fluid monitoring system 102 may log into the analysis system 708 and provide images and/or video. The analysis system 708 may recognize a fluid monitoring system 102 based on the login, encryption keys, and/or identifiers, and retrieve information associated with a site related to the fluid monitoring system 102 (e.g., fluid storage tank identifiers, image capture device identifiers, fluid storage tank capacities, information regarding known regions of interest for images captured by one or more different image capture devices at the associated site, historical information regarding volumes, thresholds for rate changes, and the like). The retrieved information may be used by the fluid monitoring system 102 to analyze and provide information (e.g., volume estimation, fluid level calculations, warning for threshold violations, and/or indications of possible leaks).

The fluid monitoring system 702A may capture images from image storage devices located at site 704A. in some embodiments, the fluid monitoring system 702A may provide the images or video to the analysis system 708.

In various embodiments, the graphical user interface may allow the user to retrieve information regarding any number of storage tanks or other equipment located at a particular site (e.g., a particular fluid storage station). In some embodiments, the graphical user interface may allow the user to retrieve information regarding any number of storage tanks or other equipment located at any number of particular sites. For example, there may be any number of image capture device 104 located at various positions at various sites. The different sites may be remote from each other.

In various embodiments, the client system 110 may communicate with the fluid monitoring system 102 over or using a webpage and web server. For example, the webserver may provide a webpage accessible to the client system 110. In some embodiments, the client system 110 may be required to register and/or log into the webserver, control system, or other device to access the webpage. Log information and or information retrieved from the datastores may be logged or otherwise tracked and stored in the fluid datastore 214. The webpage may provide a notification of a fluid leak which occurred during a period of time. In various embodiments, the client system 110 communicates with the webserver to access the webpage using a VPN or other encrypted communication methodology. In some embodiments, the webpage may include an image replay of the stored fluids and changes over time.

The webpage may also provide properties of the stored fluid, such as geographic coordinates of the stored fluid, equipment identification number of the origin of the fluid storage equipment, volume, volume rate of change, and/or the like. In some embodiments, the webpage may provide this information along with a live feed such that a user of the client system 110 may be aware of the changing properties of the fluid or stored fluid as it occurs.

The client system 110 may communicate with a web page or other interface that displays a video replay option to review stored video (e.g., in the fluid datastore 214). The interface may also display volume estimates, fluid levels, rate of change, and the like at the current time and past times.

FIG. 8 depicts a block diagram of an example digital device according to some embodiments. In various embodiments, FIG. 8 is a block diagram illustrating entities of an example machine able to read instructions from a machine-readable medium and execute those instructions in a processor to perform the machine processing tasks discussed herein, such as the engine operations discussed above. Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a data store 816, a signal generation device 818 (e.g., a speaker), an audio input device 826 (e.g., a microphone) and a network interface device 820, which also are configured to communicate via the bus 808.

The data store 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network (not shown) via network interface 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but should not be limited to, data repositories in the form of solid-state memories, optical media, and magnetic media. A non-transitory machine readable medium may be a machine-readable medium.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 8. Alternatively, hardware or software engines may be stored elsewhere within a computing system.

As referenced herein, a computer or computing system includes hardware elements used for the operations described here regardless of specific reference in FIG. 8 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:

at least one processor; and memory, the memory containing instructions to control any number of the at least one processor to:

receive, from a first infrared image capture device with a first field of view, a first image including a first fluid storage tank storing a first fluid, the image including a plurality of image intensities, a first image intensity associated with a first temperature of a first portion of the first fluid storage tank with a first internal surface that is in contact with the first fluid stored therein and a second image intensity associated with a second temperature of a second portion of the first fluid storage tank with a second internal surface that is not in contact with the first fluid;

generate feature maps from the first image by applying at least a first convolutional neural network;

slide a first window across the feature maps to obtain a plurality of anchor shapes using a region proposal network;

determine if each anchor shape of the plurality of anchor shapes contains an object to generate a plurality of regions of interest;

extract feature maps from each region of interest;

classify objects in each region of interest;

identify first stored fluid using the objects based on classifications and segmentation masks, wherein each of the plurality of regions of interest is a non-rectangular, polygonal shape;

determine first volume of stored fluid based on the first stored fluid; and provide first volume to a digital device for display.

2. The system of claim 1, wherein the memory contains the instructions to control any number of the at least one processor to further determine a fluid level of the first stored fluid within the first fluid storage tank.

3. The system of claim 1, wherein the memory contains the instructions to control any number of the at least one processor to further determine provide the first image and first volume to the digital device for display.

4. The system of claim 1, wherein the memory contains the instructions to control any number of the at least one processor to further:

compare the first volume to a previously determined volume of the first storage tank taken at a different time to generate a volume rate change;

compare the volume rate change to threshold; and provide a notification to the digital device based on the comparison of the volume rate change to the threshold.

5. The system of claim 4, wherein the memory contains the instructions to control any number of the at least one processor to further receive the threshold from the digital device.

6. The system of claim 4, wherein the memory contains the instructions to control any number of the at least one processor to further compare previous historical volumes of the first storage tank to a historical rate change for a particular duration of time, wherein the threshold is the historical rate change.

7. The system of claim 6, wherein the memory contains the instructions to control any number of the at least one processor to further update the threshold using the previous historical volumes of the first storage tank for an updated duration of time.

8. The system of claim 1, wherein the first image further includes a second fluid storage tank storing a second fluid, a third image intensity associated with a third temperature of a third external portion of the second fluid storage tank, the third external portion being opposite to a third internal portion of the second fluid storage tank, the third internal portion being in contact with the second fluid and a fourth image intensity associated with a fourth temperature of a fourth external portion of the second fluid storage tank, the fourth external portion being opposite to a fourth internal portion of the second fluid storage tank, the second portion not being in contact with the second fluid, the memory contains the instructions to control any number of the at least one processor to further:

identify second stored fluid using the objects based on classifications and the segmentation masks;

determine second volume of stored fluid based on the second stored fluid; and provide second volume to a digital device for display.

9. The system of claim 1, wherein the first image capture device is a thermographic image capture device.

* * * * *